US007769682B2

(12) United States Patent
Moudgal

(10) Patent No.: US 7,769,682 B2
(45) Date of Patent: Aug. 3, 2010

(54) FINANCIAL TRANSACTION ANALYSIS USING DIRECTED GRAPHS

(75) Inventor: Lakshminarasimha Moudgal, Kormanagala Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1938 days.

(21) Appl. No.: 10/778,813

(22) Filed: Feb. 13, 2004

(65) Prior Publication Data

US 2005/0182708 A1 Aug. 18, 2005

(51) Int. Cl.
*G06Q 40/00* (2006.01)
(52) U.S. Cl. ...................................... 705/38
(58) Field of Classification Search .................. 705/38
See application file for complete search history.

(56) References Cited

U.S. PATENT DOCUMENTS

| | | | |
|---|---|---|---|
| 4,814,978 A | 3/1989 | Dennis | |
| 4,989,141 A | 1/1991 | Lyons et al. | |
| 5,245,535 A | 9/1993 | Weiss et al. | |
| 5,488,671 A | 1/1996 | Kern | |
| 5,872,844 A | 2/1999 | Yacobi | |
| 5,878,138 A | 3/1999 | Yacobi | |
| 5,895,453 A | 4/1999 | Cook | |
| 6,119,103 A | 9/2000 | Basch et al. | |
| 6,418,467 B1 | 7/2002 | Schweitzer et al. | |
| 6,606,606 B2 | 8/2003 | Starr | |
| 7,249,094 B2 * | 7/2007 | Levchin et al. ............... | 705/39 |
| 2003/0174165 A1 * | 9/2003 | Barney ......................... | 345/747 |

OTHER PUBLICATIONS

Danial A. Keim ; IEEE Transactions on Visualisation and Computer Graphs, vol. 8, No. 1, Jan.-Mar. 2002.*
Dongsong Zhang ; IEEE Transactios on Systems, Man and Cybernetics-Part C: Application and Reviews, Vil. 34, No. 4, Nov. 2004.*
Mao Lin Huang; A Visualization Approach for frauds Detection in Financial Market; 2009 13 the International Conference Information Visualization, School of Computing and Mathematics, University of Western, Sydney, Australia.*

* cited by examiner

*Primary Examiner*—Hani Kazimi
*Assistant Examiner*—Hatem Ali
(74) *Attorney, Agent, or Firm*—Schmeiser, Olsen & Watts; Anna L. Linne

(57) ABSTRACT

A method, computer system, and computer program for determining suspect entities engaged in financial transactions. A focus entity and peripheral entities are selected such that each peripheral entity has financial transactions with F within a period of time that is subsequently partitioned into at least two time intervals. Directed graphs are generated for each time interval. Each directed graph consists of a focus node, a plurality of peripheral nodes, and edges between the focus node and the peripheral nodes. The focus node represents F. Each peripheral node represents one of the peripheral entities. Each edge has a weight that is a function of the financial transaction between F and the peripheral node within the time interval. Out-of-norm edges are determined from the directed graphs using edge-selection criteria. Potential suspect entities are identified from the out-of-norm edges. The suspect entities are determined from the potential suspect entities.

39 Claims, 18 Drawing Sheets

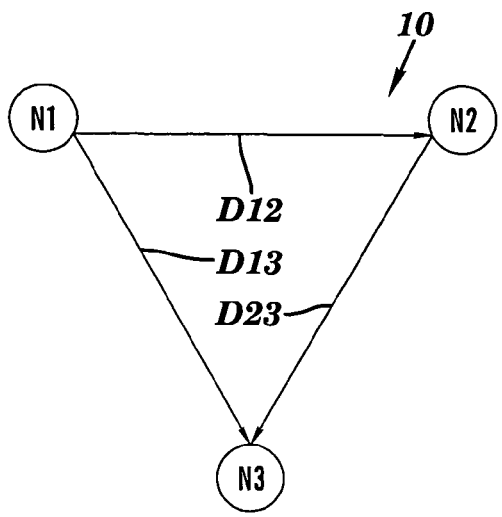
FIG. 1
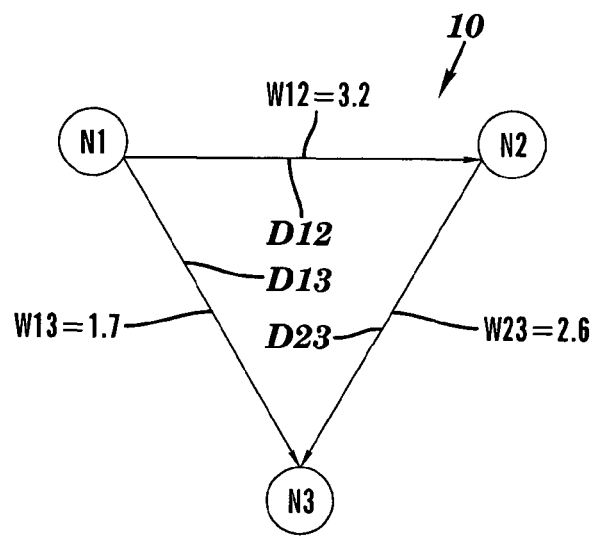
FIG. 2
FIG. 3

| TRANS. NO. | PARTICIPANTS | | AMOUNT | DATE |
|---|---|---|---|---|
| | SOURCE | TARGET | | |
| 1 | E1 | E2 | 1200.00 | 1/1/1998 |
| 2 | E8 | E2 | 4000.00 | 1/6/1998 |
| 3 | E2 | E5 | 78.00 | 1/9/1998 |
| 4 | E2 | E6 | 925.00 | 1/10/1998 |
| 5 | E1 | E2 | 1221.00 | 1/16/1998 |
| 6 | E2 | E4 | 1123.00 | 1/26/1998 |
| 7 | E2 | E7 | 2900.00 | 1/28/1998 |
| 8 | E2 | E3 | 56.00 | 1/28/1998 |
| 9 | E1 | E2 | 1210.00 | 2/1/1998 |
| 10 | E2 | E5 | 77.00 | 2/9/1998 |
| 11 | E2 | E6 | 925.00 | 2/10/1998 |
| 12 | E1 | E2 | 1220.00 | 2/17/1998 |
| 13 | E2 | E4 | 689.00 | 2/26/1998 |
| 14 | E2 | E3 | 66.00 | 2/28/1998 |
| 15 | E1 | E2 | 1205.00 | 3/1/1998 |
| 16 | E2 | E5 | 79.00 | 3/9/1998 |
| 17 | E2 | E6 | 925.00 | 3/10/1998 |
| 18 | E1 | E2 | 1220.00 | 3/16/1998 |
| 19 | E1 | E2 | 3445.00 | 3/17/1998 |
| 20 | E2 | E4 | 782.00 | 3/26/1998 |
| 21 | E2 | E3 | 81.00 | 3/28/1998 |
| 22 | E1 | E2 | 1212.00 | 4/1/1998 |
| 23 | E2 | E5 | 73.00 | 4/9/1998 |
| 24 | E2 | E6 | 927.00 | 4/10/1998 |
| 25 | E1 | E2 | 1210.00 | 4/16/1998 |
| 26 | E2 | E4 | 987.00 | 4/26/1998 |
| 27 | E2 | E3 | 56.00 | 4/28/1998 |
| 28 | E9 | E2 | 3445.88 | 4/29/1998 |

*FIG. 10A*

| TRANS. NO. | PARTICIPANTS | | AMOUNT | DATE |
|---|---|---|---|---|
| | SOURCE | TARGET | | |
| 29 | E1 | E2 | 1211.00 | 5/1/1998 |
| 30 | E2 | E5 | 65.00 | 5/9/1998 |
| 31 | E2 | E6 | 933.00 | 5/10/1998 |
| 32 | E1 | E2 | 1229.00 | 5/17/1998 |
| 33 | E2 | E4 | 2232.00 | 5/26/1998 |
| 34 | E2 | E7 | 4400.00 | 5/27/1998 |
| 35 | E2 | E3 | 66.00 | 5/28/1998 |
| | | | | |
| 36 | E1 | E2 | 1208.00 | 6/1/1998 |
| 37 | E2 | E5 | 77.00 | 6/9/1998 |
| 38 | E2 | E6 | 925.00 | 6/10/1998 |
| 39 | E1 | E2 | 1222.00 | 6/17/1998 |
| 40 | E2 | E4 | 121.00 | 6/26/1998 |
| 41 | E2 | E3 | 66.00 | 6/28/1998 |
| | | | | |
| 42 | E1 | E2 | 1210.00 | 7/1/1998 |
| 43 | E2 | E5 | 74.00 | 7/9/1998 |
| 44 | E2 | E6 | 925.00 | 7/10/1998 |
| 45 | E1 | E2 | 1210.00 | 7/17/1998 |
| 46 | E2 | E4 | 344.00 | 7/26/1998 |
| 47 | E2 | E3 | 66.00 | 7/28/1998 |
| | | | | |
| 48 | E1 | E2 | 1210.00 | 8/1/1998 |
| 49 | E2 | E5 | 71.00 | 8/9/1998 |
| 50 | E8 | E2 | 3750.00 | 8/10/1998 |
| 51 | E2 | E6 | 925.00 | 8/10/1998 |
| 52 | E1 | E2 | 1210.00 | 8/17/1998 |
| 53 | E2 | E4 | 1008.00 | 8/26/1998 |
| 54 | E2 | E3 | 69.00 | 8/28/1998 |
| | | | | |

*FIG. 10B*

| TRANS. NO. | PARTICIPANTS | | AMOUNT | DATE |
| --- | --- | --- | --- | --- |
| | SOURCE | TARGET | | |
| 55 | E1 | E2 | 1210.00 | 9/1/1998 |
| 56 | E2 | E5 | 70.00 | 9/9/1998 |
| 57 | E2 | E6 | 925.00 | 9/10/1998 |
| 58 | E1 | E2 | 1220.00 | 9/17/1998 |
| 59 | E2 | E4 | 232.00 | 9/26/1998 |
| 60 | E2 | E3 | 73.00 | 9/28/1998 |
| | | | | |
| 61 | E1 | E2 | 1213.00 | 10/1/1998 |
| 62 | E2 | E5 | 81.00 | 10/9/1998 |
| 63 | E2 | E6 | 925.00 | 10/10/1998 |
| 64 | E1 | E2 | 1220.00 | 10/17/1998 |
| 65 | E2 | E4 | 229.00 | 10/26/1998 |
| 66 | E2 | E3 | 71.00 | 10/28/1998 |
| | | | | |
| 67 | E1 | E2 | 1210.00 | 11/1/1998 |
| 68 | E2 | E5 | 77.00 | 11/9/1998 |
| 69 | E2 | E6 | 925.00 | 11/10/1998 |
| 70 | E1 | E2 | 1220.00 | 11/17/1998 |
| 71 | E2 | E4 | 912.00 | 11/26/1998 |
| 72 | E2 | E3 | 74.00 | 11/28/1998 |
| | | | | |
| 73 | E1 | E2 | 1210.00 | 12/1/1998 |
| 74 | E2 | E5 | 70.00 | 12/9/1998 |
| 75 | E2 | E6 | 925.00 | 12/10/1998 |
| 76 | E1 | E2 | 1218.00 | 12/17/1998 |
| 77 | E2 | E4 | 443.00 | 12/26/1998 |
| 78 | E2 | E3 | 59.00 | 12/28/1998 |

*FIG. 10C*

DIRECTED GRAPH FOR JANUARY 1-31, 1998

DIRECTED GRAPH FOR FEBRUARY 1-28, 1998

DIRECTED GRAPH FOR MARCH 1-31, 1998

DIRECTED GRAPH FOR APRIL 1-30, 1998

DIRECTED GRAPH FOR MAY 1-31, 1998

DIRECTED GRAPH FOR JUNE 1-30, 1998

DIRECTED GRAPH FOR JULY 1-31, 1998

DIRECTED GRAPH FOR AUGUST 1-31, 1998

DIRECTED GRAPH FOR SEPTEMBER 1-30, 1998

DIRECTED GRAPH FOR OCTOBER 1-31, 1998

DIRECTED GRAPH FOR NOVEMBER 1-30, 1998

DIRECTED GRAPH FOR DECEMBER 1-31, 1998

| TRANSACTION PATTERNS ANALYSIS – LEVEL REPORT ||||
|---|---|---|---|
| FINANCIAL INSTITUTION: FI-1 | REPORT DATE: 12/22/2001 || REPORT TIME: 14:00 |
| TRANSACTION SET FOCUS: E2 ||||
| SUSPECT ENTITY | TRANSACTION DETAILS |||
| | DATE | AMOUNT ($) | PAYEE |
| E7 | 1/28/1998 | 2900.00 | E7 |
| | 5/27/1998 | 4400.00 | E7 |
| E8 | 1/6/1998 | 4000.00 | E2 |
| | 8/10/1998 | 3750.00 | E2 |

SAMPLE REPORT 1

*FIG. 13*

| TRANSACTION PATTERNS ANALYSIS – LEVEL REPORT ||||
|---|---|---|---|
| REPORT DATE: 12/23/2001 ||| REPORT TIME: 14:00 |
| LEVEL 1 TRANSACTION SET FOCUS: E2 ||| LEVEL 1: FINANCIAL INSTITUTION: FI-1 |
| LEVEL 2: TRANSACTION SET FOCUS: E7 ||| LEVEL 2 FINANCIAL INSTITUTION: FI-2 |
| SUSPECT ENTITY | TRANSACTION DETAILS |||
| | DATE | AMOUNT ($) | PAYEE |
| E23 | 3/1/1998 | 4859.00 | E23 |
| | 3/1/1998 | 2390.00 | E7 |
| E16 | 1/3/1998 | 3600.00 | E16 |
| | 7/5/1998 | 3200.00 | E16 |
| | 8/1/1998 | 1200.00 | E7 |
| | 8/17/1998 | 1800.00 | E16 |
| E67 | 1/23/1998 | 3850.00 | E67 |
| | 8/10/1998 | 1960.00 | E67 |
| | 12/20/1998 | 2300.00 | E67 |
| E43 | 4/12/1998 | 4100.00 | E7 |
| | 6/13/1998 | 3000.00 | E43 |
| | 7/15/1998 | 4650.00 | E43 |
| E123 | 5/18/1998 | 1200.00 | E123 |
| | 7/17/1998 | 4900.00 | E123 |
| E142 | 1/10/1998 | 3300.00 | E7 |
| | 2/17/1998 | 2100.00 | E7 |
| | 11/13/1998 | 1650.00 | E7 |
| E161 | 10/1/1998 | 4800.00 | E7 |

SAMPLE REPORT 2

*FIG. 14*

| TRANSACTION PATTERNS ANALYSIS – LEVEL II REPORT ||||
|---|---|---|---|
| REPORT DATE: 12/23/2001 || REPORT TIME: 16:00 ||
| LEVEL 1 TRANSACTION SET FOCUS: E2 || LEVEL 1: FINANCIAL INSTITUTION: FI-1 ||
| LEVEL 2: TRANSACTION SET FOCUS: E8 || LEVEL 2 FINANCIAL INSTITUTION: FI-2 ||
| SUSPECT ENTITY | TRANSACTION DETAILS |||
| | DATE | AMOUNT ($) | PAYEE |
| E56 | 2/10/1999 | 1080.00 | E8 |
| | 5/16/1999 | 2134.00 | E8 |
| | 6/12/1999 | 3343.89 | E8 |
| E67 | 3/12/1999 | 1967.33 | E67 |
| | 4/18/1999 | 3345.89 | E67 |
| | 9/14/1999 | 4750.00 | E67 |
| E142 | 1/19/1999 | 2345.00 | E8 |
| | 2/26/1999 | 3322.00 | E142 |
| | 7/19/1999 | 1100.00 | E142 |
| | 8/16/1999 | 345.00 | E142 |
| E161 | 9/16/1999 | 1332.00 | E8 |
| | 9/19/1999 | 2556.00 | E8 |
| | 10/02/1999 | 4980.00 | E8 |
| E177 | 2/12/1999 | 3450.11 | E177 |
| | 12/12/1999 | 1211.99 | E177 |

SAMPLE REPORT 3

FIG. 15

| TRANSACTION PATTERNS ANALYSIS – COMPOSITE REPORT ||
|---|---|
| REPORT DATE: 12/23/2001 | REPORT TIME: 16:00 |
| LEVEL 1 TRANSACTION SET FOCUS: E2 | LEVEL 1: FINANCIAL INSTITUTION: FI-1 |
| LEVEL 1 SUSPECT ENTITIES | LEVEL 2 SUSPECT ENTITIES |
| E7 | E23, E16, E67, E43, E123, E142, E161 |
| E8 | E56, E67, E142, E161, E177 |

SAMPLE REPORT 4

FIG. 16

FINANCIAL TRANSACTION ANALYSIS USING DIRECTED GRAPHS

BACKGROUND OF THE INVENTION

1. Technical Field

The present invention relates to a method, computer system, and computer program product for enabling financial institutions and government regulatory agencies to analyze financial transaction data for detecting out-of-norm financial transactions, such as fraudulent financial transactions, that occur between entities such as individuals, corporations, and government agencies.

2. Related Art

Financial transactions facilitated by financial institutions such as banks, stock brokerage houses, insurance companies, etc. are recorded in databases of computer systems. The volume of such financial transactions that occur on a daily basis will typically be in the several hundred millions. Although a majority of these financial transactions are legitimate and constitute legal transactions, a small minority of such transactions may involve fraudulent activity such as money laundering, tax evasion, and "insider" stock trading.

In addition to processing the daily volume of financial transactions, a historical archive of this data has to be maintained by financial institutions as mandated by government regulations. A comprehensive analysis of transactions requires access to historical data that has to be collected from a multitude of financial institutions, since a majority of transactions typically involve separate financial institutions that are operating on behalf of parties involved in the transaction. Timely detection of fraudulent activities requires rapid analysis of this consolidated data that can contain billions of transaction records.

A fraudulent transaction typically involves more than just a pair of participants. Most fraudulent transactions routinely involve several "intermediaries" so that the fraudulent intents are well-concealed. Hence, an effective approach for fraud detection will require analysis of transactions spanning multiple participants operating through different financial institutions and in different geographical areas.

Unfortunately, the dynamic nature and the size of transaction data sets coupled with the need to analyze transactions involving multiple participants renders known techniques unsuitable for timely detection of fraudulent transactions.

Accordingly, there is a need for a method, computer system, and computer program product that can efficiently analyze financial transactions contained in very large data sets for rapid detection of fraudulent activities and identification of entities responsible for such transactions.

SUMMARY OF THE INVENTION

The present invention provides a method for determining suspect entities engaged in financial transactions, comprising the steps of:

a) selecting a focus entity F and a plurality of peripheral entities, each peripheral entity having one or more financial transaction with F within a period of time T;

b) partitioning the period of time T into a plurality of time intervals;

c) generating a directed graph for each time interval of the plurality of time intervals, each directed graph consisting of a focus node, a plurality of peripheral nodes, and edges between the focus node and the peripheral nodes, the focus node representing F, each peripheral node representing a peripheral entity having at least one directed financial transaction of said one or more directed financial transactions with F within the time interval, each edge having a weight, said weight being a function of the at least one directed financial transaction between F and the peripheral node within the time interval;

d) determining, from the directed graphs or from a representation of the directed graphs, whether any of said edges are out-of-norm edges, said determining including applying edge-selection criteria to the weights associated with the edges of the directed graphs; and e) if any of said edges are so determined to be out-of-norm edges then identifying at least one potential suspect entity from the out-of-norm edges, followed by deriving at least one suspect entity from the at least one potential suspect entity.

The present invention provides a computer system having a processor, said processor adapted to execute computer readable program code, said computer readable program code comprising an algorithm for determining suspect entities engaged in financial transactions, said algorithm adapted to execute the steps of:

a) selecting a focus entity F and a plurality of peripheral entities, each peripheral entity having one or more financial transaction with F within a period of time T;

b) partitioning the period of time T into a plurality of time intervals;

c) generating a directed graph for each time interval of the plurality of time intervals, each directed graph consisting of a focus node, a plurality of peripheral nodes, and edges between the focus node and the peripheral nodes, the focus node representing F, each peripheral node representing a peripheral entity having at least one directed financial transaction of said one or more directed financial transactions with F within the time interval, each edge having a weight, said weight being a function of the at least one directed financial transaction between F and the peripheral node within the time interval;

d) determining, from the directed graphs or from a representation of the directed graphs, whether any of said edges are out-of-norm edges, said determining including applying edge-selection criteria to the weights associated with the edges of the directed graphs; and e) if any of said edges are so determined to be out-of-norm edges then identifying at least one potential suspect entity from the out-of-norm edges, followed by deriving at least one suspect entity from the at least one potential suspect entity.

The present invention provides a computer program product, comprising a computer usable medium having a computer readable program code embodied therein, said computer readable program code comprising an algorithm for determining suspect entities engaged in financial transactions, said algorithm adapted to execute the steps of:

a) selecting a focus entity F and a plurality of peripheral entities, each peripheral entity having one or more financial transaction with F within a period of time T;

b) partitioning the period of time T into a plurality of time intervals;

c) generating a unifocused directed graph for each time interval of the plurality of time intervals, each directed graph consisting of a focus node, a plurality of peripheral nodes, and edges between the focus node and the peripheral nodes, the focus node representing F, each peripheral node representing a peripheral entity having at least one directed financial transaction of said one or more directed financial transactions with F within the time interval, each edge having a weight, said weight being a function of the at least one directed financial transaction between F and the peripheral node within the time interval;

d) determining, from the directed graphs or from a representation of the directed graphs, whether any of said edges are out-of-norm edges, said determining including applying edge-selection criteria to the weights associated with the edges of the directed graphs; and e) if any of said edges are so determined to be out-of-norm edges then identifying at least one potential suspect entity from the out-of-norm edges, followed by deriving at least one suspect entity from the at least one potential suspect entity.

The present invention provides a method, computer system, and computer program product that can efficiently analyze financial transactions contained in very large data sets for rapid detection of fraudulent activities and identification of entities responsible for such fraudulent transactions.

BRIEF DESCRIPTION OF THE DRAWINGS

FIG. 1 illustrate a directed graph, in accordance with embodiments of the present invention.

FIG. 2 depicts the directed graph of FIG. 1 with the addition of weights to the edges of said directed graph, in accordance with embodiments of the present invention.

FIG. 3 depicts a matrix that symbolically represents the weights of the directed graph of FIG. 2, in accordance with embodiments of the present invention.

FIGS. 10A, 10B, and 10C (collectively, "FIG. 10") collectively tabulate a set of financial transactions recorded in a database of a financial institution for a calendar year, in accordance with embodiments of the present invention.

FIGS. 13-16 are illustrative reports generated from the results of the analysis of the directed graphs of FIG. 11, in accordance with embodiments of the present invention.

DETAILED DESCRIPTION OF THE INVENTION

Figures 4, 5, 6:
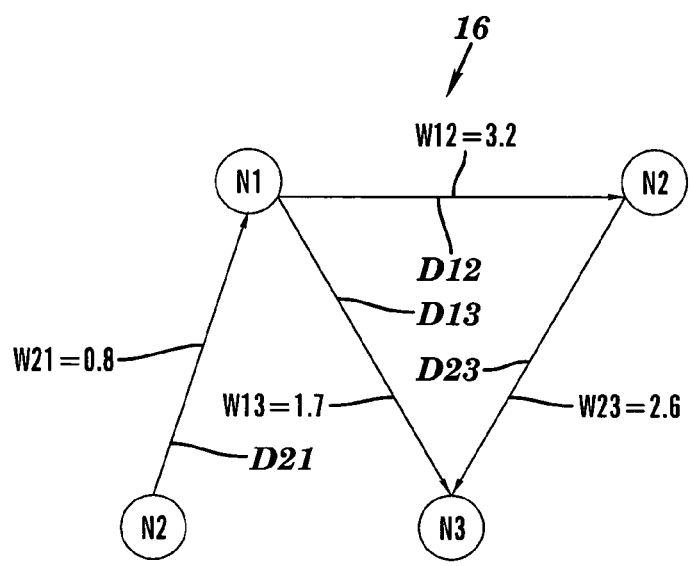
FIG. 4 depicts a matrix having the numerical values of the weights of the directed graph of FIG. 2, in accordance with embodiments of the present invention.
FIG. 5 depicts a directed graph which is a modification of the directed graph of FIG. 2, in accordance with embodiments of the present invention.
FIG. 6 depicts a matrix that represents the directed of FIG. 5, in accordance with embodiments of the present invention.

The set of all financial transactions facilitated by a financial institution can be partitioned into multiple sub-sets, with each sub-set representing transactions that involve a common entity, called a "focus entity". For example, if an individual bank account is considered as the focus entity F, then all of the financial transactions that involve credits or debits to that focus entity F (i.e., the individual bank account) are between the focus entity F and other entities, called "peripheral entities", and are considered to belong to the focus entity F. The set of such transactions over a given period of time between the focus entity F and the peripheral entities is called a "Transaction Set Focus". A set of entities having the role of focus entity is called a set of "Transaction Set Focus Points". Note that the peripheral entities are specific to the focus entity F. For example, a peripheral entity relative to F can also be a focus entity having its own peripheral entities and an associated Transaction Set Focus.

Note that the term "entity" is defined as a construct that participates in one or more financial transactions with one or more other entities. Example of entities include, inter alia, individual bank accounts, individual stock brokerage accounts, organizational accounts (e.g., corporate bank accounts, labor union bank accounts, charitable organizational bank accounts, etc.).

A large percentage of financial transactions between a pair of entities may occur at regular frequency. For example, credit to an individual's bank account via payroll and debits from the account via checks or Electronic Funds Transfer to pay mortgage or utility bills occurs at regular or near-regular time intervals.

Further, a large number of transactions may occur between a same pair of entities. For example, an individual's bank account and the employer may form the same pair of entities.

In addition, most of the transactions may involve monetary exchange within a discernable range. Using the example of mortgage payment transaction, the value of the debit will not significantly vary from one time period to another. By sampling a transaction set over discrete intervals of time, a "weighted directed graph" representation can be established. This directed graph represents a transaction pattern for a specific time interval. The sampling intervals can be established by, inter alia, examining the frequency of transactions between the same entities.

The transaction patterns for a specific Transaction Set Focus associated with the focus entity F are compared with each other using a set of criteria. Transactions that are responsible for dissimilarities among transaction patterns are identified as "suspect transactions". Entities participating in such transaction are "potential suspect entities" and a subset of said "potential suspect entities" are "suspect entities". The suspect entities may be derived from the potential subset entities through a comparison with a set of known, valid entities, as will be explained infra. These suspect entities may be treated as new focus entities and the process of transaction pattern generation, comparison, suspect transaction determination, and suspect entity identification may repeated to generate a set of reports for aiding fraudulent activity investigation.

A "directed financial transaction" between a first entity and a second entity is defined as a transaction in which money or its equivalent (e.g., credit, goods, services, etc.) is transferred from the first entity to the second entity, or vice versa, in a fixed direction. In other words, specifying a directed financial transaction between the first entity and the second entity requires specification of both the magnitude (e.g., dollar value) and the direction of the transaction (i.e., from the first entity to the second entity, or from the second entity to the first entity). With the present invention, transactions in a first direction between the first and second entities are classified separately from transactions in a second direction between the first and second entities, wherein the first and second directions are opposite to each other.

The concept of "directed graph" will next described. A directed graph is a graph comprising nodes and edges, said edges each having an associated direction. An edge is a line that connects a first node and a second node with each other. Each edge is oriented from the first node to the second node and is characterized by a terminating arrow pointing from the first node toward the second node. Thus the direction associated with an edge is the direction pointed to by the terminating arrow.

FIGS. 1 and 2 illustrate directed graphs, in accordance with embodiments of the present invention. FIG. 1 depicts a directed graph 10 having nodes N1, N2, and N3, and edges D12, D13, and D23. The edge D12 between node N1 and node N2 is directed from node N1 to node N2. The edge D13 between node N1 and node N3 is directed from node N1 to node N3. The edge D23 between node N2 and node N3 is directed from node N2 to node N3. Three edges are nonexistent in FIG. 1, namely edge D21 (from node N2 to node N1), edge D31 (from node N3 to node N1), and edge D23 (from node N2 to node N3). For the present invention, the nodes represent entities and the edges represent financial transactions between the nodes connected by the edges.

Each edge D(I,J) from node E(I) to node E(J) has an associated weight W(I,J) as shown in the directed graph 10 in FIG. 2. In FIG. 2, the weights W12, W13, and W23 (having numerical values of 3.2, 1.7, and 2.6, respectively) are associated with edges D12, D13, and D23, respectively. The nonexistent edges of D21, D31, and D23 are considered to have weights W21=0, W31=0, and W23=0, respectively. A directed graph having weights is called a "weighted directed graph". For the present invention, the weights are related to the value of the financial transactions associated with the edges, as will be explained infra.

The weights of a directed graph may be represented by a matrix. FIG. 3 depicts a 3×3 matrix 12 that symbolically represents the weights of the three-node weighted directed graph of FIG. 2, in accordance with embodiments of the present invention. FIG. 4 depicts a matrix 14 having the numerical values of the weights of the three-node weighted directed graph of FIG. 2, in accordance with embodiments of the present invention. Note that the diagonal elements W11, W22, and W33 of the matrices 12 and 14 of FIGS. 3 and 4, respectively, each have a value of zero, since the corresponding edges D11, D22, and D33 cannot exist inasmuch as an edge cannot exist between two nodes which are actually a same node.

As explained supra, two edges potentially exist between two nodes (e.g., N1 and N2) of the directed graph 10 of FIG. 2; i.e., a first edge D12 having a direction from N1 to N2, and a second edge D21 having a direction from N2 to N1. Accordingly, FIG. 5 illustrates a directed graph 16, which is a modification of the directed graph 10 of FIG. 2 such that D21 exists because W21 has a non-zero weight, namely 0.8, in accordance with embodiments of the present invention. Note that the node N2 appears twice in FIG. 5 and node N1 appears once, with the double appearance of N2 being used to represent the two directions (i.e., direction from N1 to N2, and the direction from N2 to N1). Alternatively, FIG. 5 could have been redrawn such that the node N1 appears twice and node N2 appears once.

FIG. 6 depicts a matrix 18 that represents the directed of FIG. 5, in accordance with embodiments of the present invention. The matrix 18 of FIG. 6 is the matrix 14 of FIG. 4 after the matrix element of D21=0.8 has been inserted into the matrix 14.

The present invention uses a particular type of directed graph called a unifocused directed graph, which is defined as a directed graph consisting of one focus node, one or more peripheral nodes, and edges connecting the focus node to the peripheral nodes. In a unifocused directed graph, no two peripheral nodes have a connecting edge therebetween. A weighted unifocused directed graph is a unifocused directed graph whose edges have an associated weight.

Figure 7:
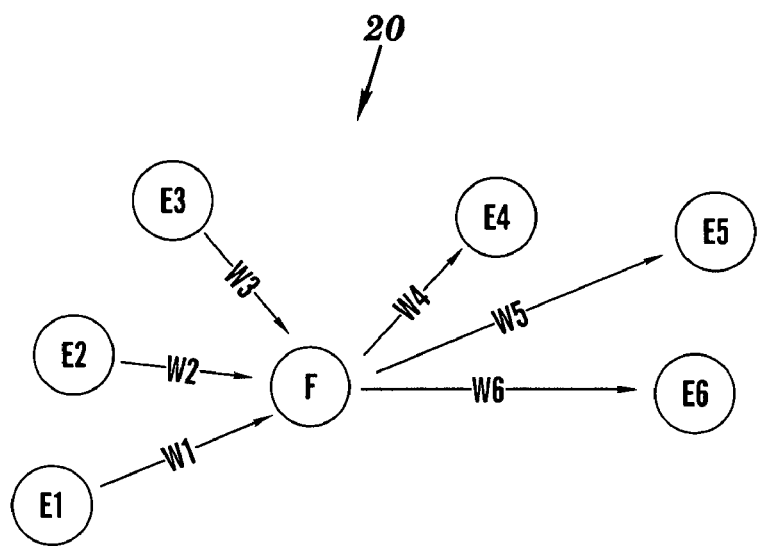
FIG. 7 depicts a weighted unifocused directed graph, in accordance with embodiments of the present invention.

FIG. 7 depicts a weighted unifocused directed graph 20, in accordance with embodiments of the present invention. The directed graph 20 in FIG. 7 has a focus node F and peripheral nodes E1, E2, E3, E4, E5, and E6. The edges connecting node F to peripheral nodes E1, E2, E3, E4, E5, and E6 have weights which are respectively denoted as W1, W2, W3, W4, W5, and W6. The edges between F and E1, E2, and E3 are each directed from E1 to F, E2 to F, and E3 to F, respectively. The edges between F and E4, E5, and E6 are each directed from F to E4, F to E5, and F to E6, respectively. As depicted in FIG. 7, each peripheral node E1, E2, E3, E4, E5, and E6 is directly connected to the focus node F by a different edge having weight W1, W2, W3, W4, W5, and W6, respectively.

Figure 8:
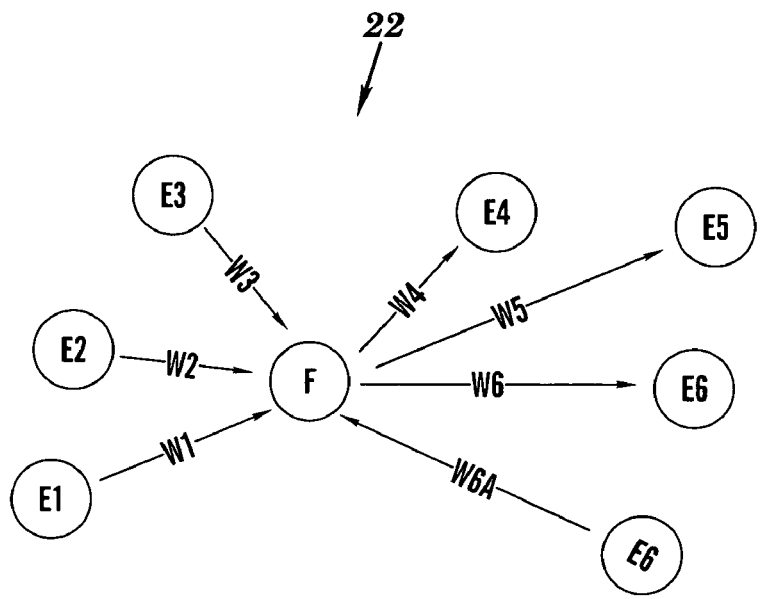
FIG. 8 depicts the directed graph of FIG. 7 with an added node, in accordance with embodiments of the present invention.

FIG. 8 depicts a directed graph 22, which is the directed graph 20 of FIG. 7 with an additional E6 node having an edge directed from E6 to F with an associated weight W6A, in accordance with embodiments of the present invention. The directed graph 22 of FIG. 8 having two appearances of E6 as distinct nodes is analogous to the directed graph 16 of FIG. 5 having two appearances of N2 as distinct nodes.

Figure 9:
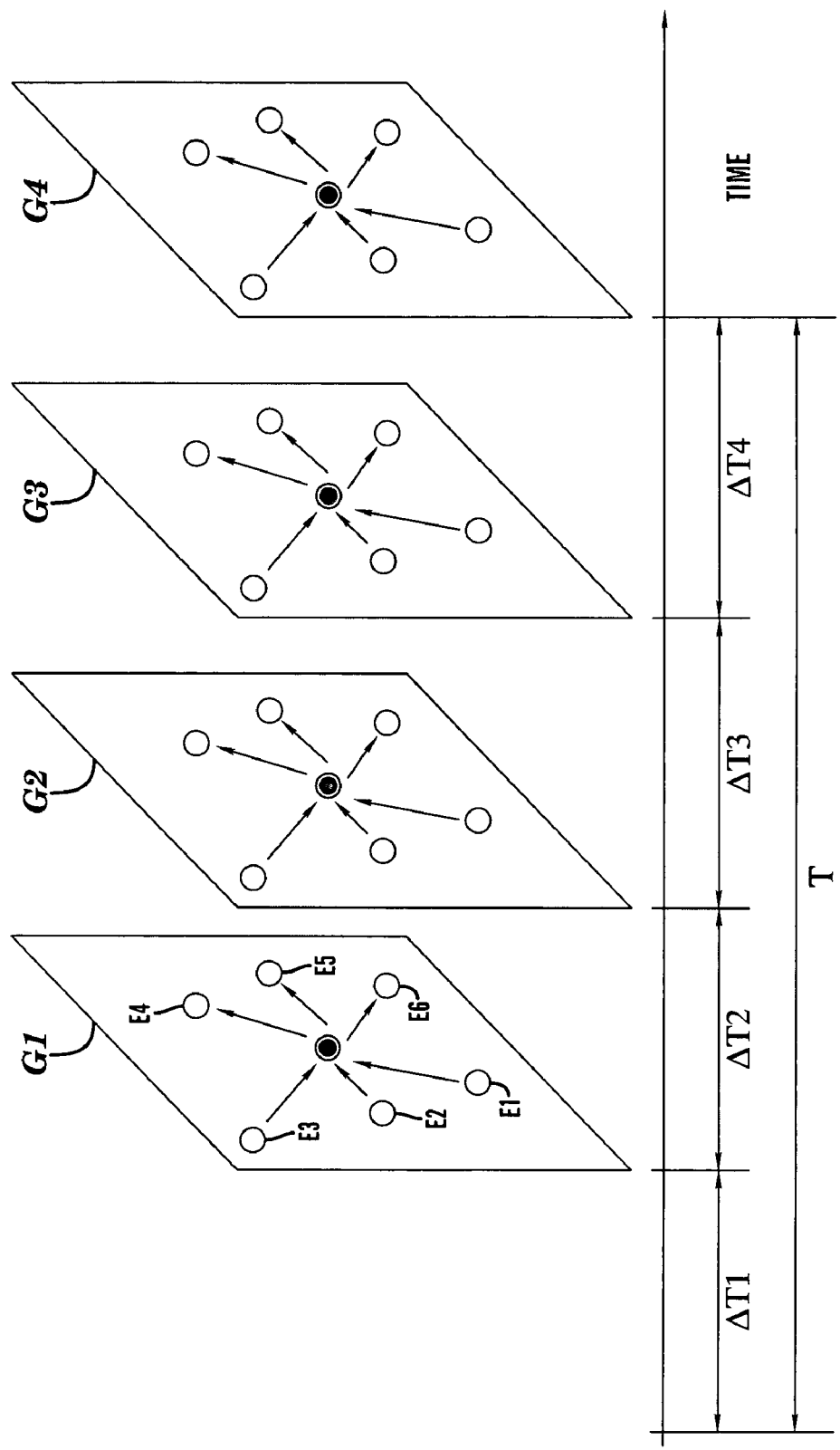
FIG. 9 depicts a series of unifocused directed graphs representing financial transactions distributed over a period of time, in accordance with embodiments of the present invention.

FIG. 9 depicts a series of four unifocused directed graphs, denoted as G1, G2, G3, and G4, representing financial transactions distributed over a period of time T, in accordance with embodiments of the present invention. The directed graphs G1, G2, G3, and G4 relate to the directed graph 20 of FIG. 7 having focus node F and peripheral nodes E1, E2, E3, E4, E5, and E6. The period of time T has been partitioned into four time intervals $\Delta T1$, $\Delta T2$, $\Delta T3$, and $\Delta T4$ represented by the directed graphs G1, G2, G3, and G4, respectively. While the time intervals $\Delta T1$, $\Delta T2$, $\Delta T3$, and $\Delta T4$ are constant (i.e., uniformly spaced) within the period of time T (i.e., $\Delta T1 = \Delta T2 = \Delta T3 = \Delta T4$), the time intervals may alternatively be variable (i.e., nonuniformly spaced) within the period of time T. Noting that the directed graphs G1, G2, G3, and G4 represent financial transaction data, the partitioning of the period of time T into the time intervals $\Delta T1$, $\Delta T2$, $\Delta T3$, and $\Delta T4$ may take into account said financial transaction data. Alternatively, the time intervals $\Delta T1$, $\Delta T2$, $\Delta T3$, and $\Delta T4$ may be predetermined without taking into account said financial transaction data.

While each directed graph G1, G2, G3, and G4 depicts the same six peripheral nodes E1, E2, E3, E4, E5, and E6, such a series of directed graphs generally may not all show the exact same peripheral nodes. Accordingly, the peripheral nodes may vary between adjacent directed graphs.

Next presented in conjunction with FIGS. 10-16 is an example illustrating embodiments of the present invention. FIGS. 10A, 10B, and 10C (collectively, "FIG. 10") tabulates a set of financial transactions recorded in, or managed by, a database of a financial institution FI-1 (e.g., a bank) for the calendar year 1998, in accordance with embodiments of the present invention. Each transaction in FIG. 10 has a source entity and a target entity, wherein the indicated "Amount" has been transferred from the source entity to the target entity on the indicated "Date". A total of 78 transactions has been recorded for the calendar year 1998 and some of said transactions have occurred in each calendar month of 1998.

The entities that participated in the 78 transactions during 1998 are: E1, E2, E3, E4, E5, E6, E7, E8, and E9. However, only E2 and E8 are customers of the financial institution FI-1. Thus, the only entities that will be included in the set of "Transaction Set Focus Points" are E2 and E8 (i.e.; only E2 and E8 will have the role of focus entity in the subsequent Level 1 analysis). The analysis is sequenced such that E2 is the first focus entity analyzed, to be followed by analysis of E8 as the second focus entity. Thus, the analysis next proceeds with E2 functioning as the focus entity and E1, E3, E4, E5, E6, E7, E8, and E9 are the peripheral entities.

The period of time T encompassing the financial transaction data of FIG. 10 is one year, namely the calendar year 1998. Next, the period of time T is partitioned into time intervals such that the financial transactions occurring in each time interval will be represented by a weighted unifocused directed graph. The time intervals will be based on the transaction frequency (i.e., frequency of transactions between focus entity E2 and the peripheral entities, namely E1, E3, E4, E5, E6, E7, E8, and E9). The frequency at which a majority of transactions appear will be the transaction frequency for the set of transactions involving the focus entity E2. From the example transaction set of FIG. 10, the sampling frequencies are shown in Table 1.

TABLE 1

Sampling Frequencies.

| Transaction Participants | Transaction Frequency |
| --- | --- |
| E2, E1 | Bi-monthly |
| E2, E3 | Monthly |
| E2, E4 | Monthly |
| E2, E5 | Monthly |
| E2, E6 | Monthly |
| E2, E7 | 2 times |
| E2, E8 | 2 times |
| E2, E9 | 1 time |

Since a majority of transactions occur on a monthly basis, a transaction frequency of 1 calendar month will be used as the constant time interval. The preceding algorithm for determining the time intervals is merely illustrative, and many alternative algorithms could have been used. Additionally, variable time intervals could have been used instead of the constant one-month time intervals utilized herein for purposes of illustration. An alternative algorithm for determining a constant time interval is that the constant time interval is the smallest integral number of months that is a factor of 12 and includes at least 10 transactions. Said alternative algorithm has to choose among the intervals of one month, two months, three months, four months, and six months, and would choose a two-month interval as the shortest interval having at least 10 transactions therein. An alternative algorithm for determining a variable time interval is that each time interval includes the same number of transactions; e.g., 13 transactions. The resulting 6 time intervals having 13 transactions per time interval are as shown in Table 2.

TABLE 2

Time Intervals.

| Time Interval | Transactions | Dates |
| --- | --- | --- |
| 1 | 1-13 | Jan. 1, 1998-Feb. 26, 1998 |
| 2 | 14-26 | Feb. 28, 1998-Apr. 26, 1998 |
| 3 | 27-39 | Apr. 28, 1998-Jun. 17, 1998 |
| 4 | 40-52 | Jun. 26, 1998-Aug. 17, 1998 |
| 5 | 53-65 | Aug. 26, 1998-Oct. 26, 1998 |
| 6 | 66-78 | Oct. 28, 1998-Dec. 28, 1998 |

As stated supra, the time intervals selected for the analysis of the present example is a constant monthly time interval. The resulting weighted unifocused directed graph for the focus entity E2 for the monthly time periods are shown in FIGS. 11A, 11B, 11C, 11D, 11E, 11F, 11G, 11H, 11I, 11J, 11K, and 11L, (collectively, "FIG. 11"), in accordance with embodiments of the present invention. In FIG. 11, the focus entity E2 is at the focus node, and the focus node will thus be labeled as focus node E2. Also in FIG. 11, the peripheral entities are at the corresponding peripheral nodes and the peripheral nodes will have the same identification as the corresponding peripheral entities. For example, in FIG. 11A the peripheral entity E1 is at the peripheral node E1.

Figure 11A:
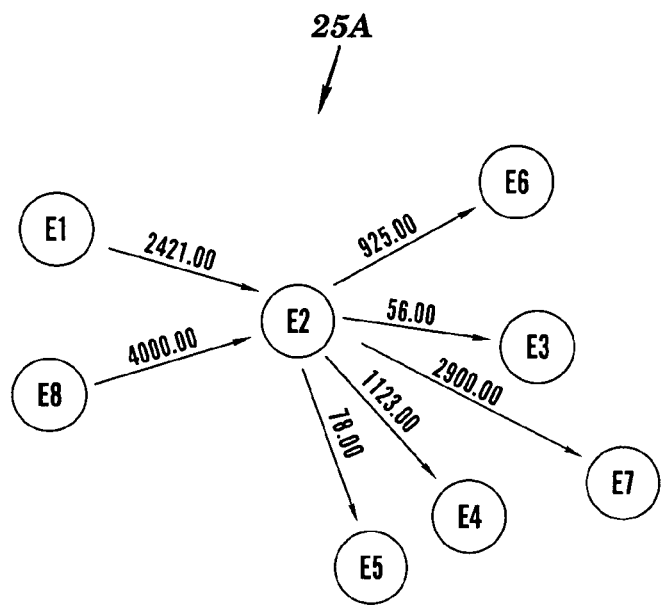
FIGS. 11A, 11B, 11C, 11D, 11E, 11F, 11G, 11H, 11I, 11J, 11K, and 11L, (collectively, "FIG. 11") depict unifocused directed graphs relating to the financial transactions of FIG. 10, in accordance with embodiments of the present invention.

FIG. 11A depicts a directed graph 25A having focus node E2 and peripheral nodes E1, E3, E4, E5, E6, and E8, and encompassing the time interval of January 1998.

Figure 11B:
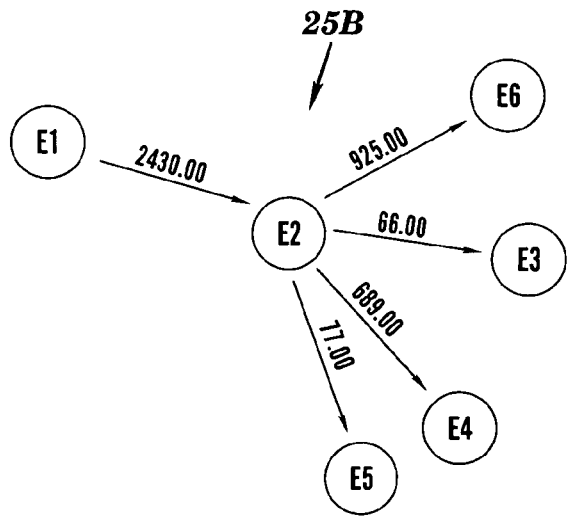

FIG. 11B depicts a directed graph 25B having focus node E2 and peripheral nodes E1, E3, E4, E5, and E6, and encompassing the time interval of February 1998.

Figure 11C:
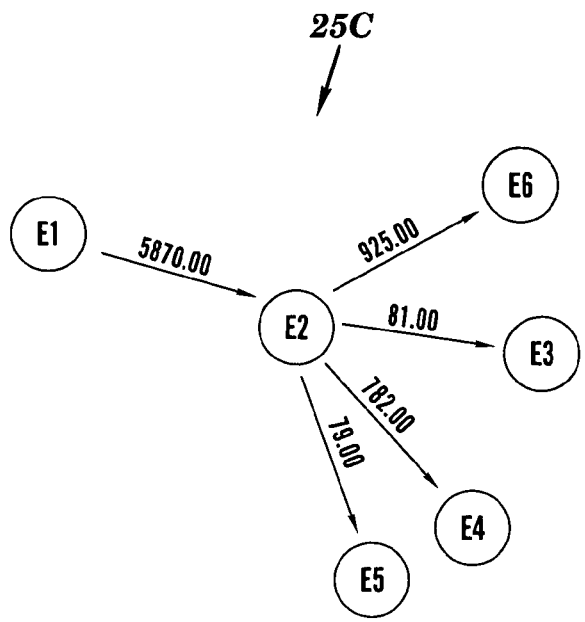

FIG. 11C depicts a directed graph 25C having focus node E2 and peripheral nodes E1, E3, E4, E5, and E6, and encompassing the time interval of March 1998.

Figure 11D:
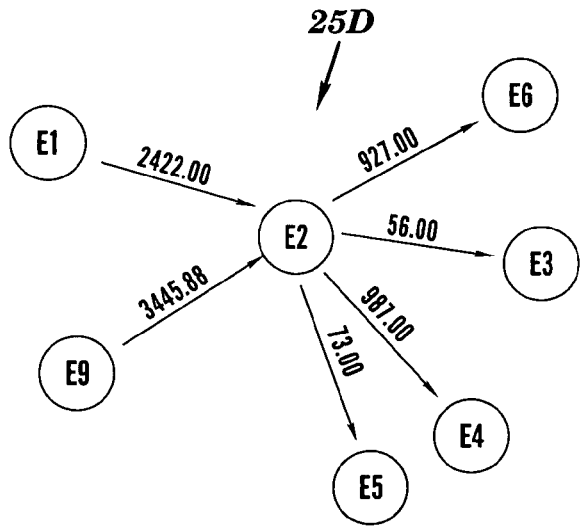

FIG. 11D depicts a directed graph 25D having focus node E2 and peripheral nodes E1, E3, E4, E5, E6, and E9, and encompassing the time interval of April 1998.

Figure 11E:
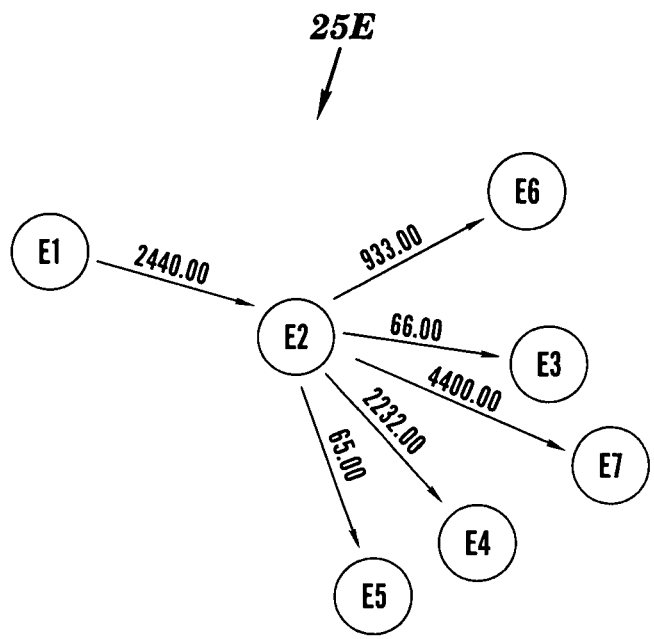

FIG. 11E depicts a directed graph 25E having focus node E2 and peripheral nodes E1, E3, E4, E5, E6, and E7, and encompassing the time interval of May 1998.

Figure 11F:
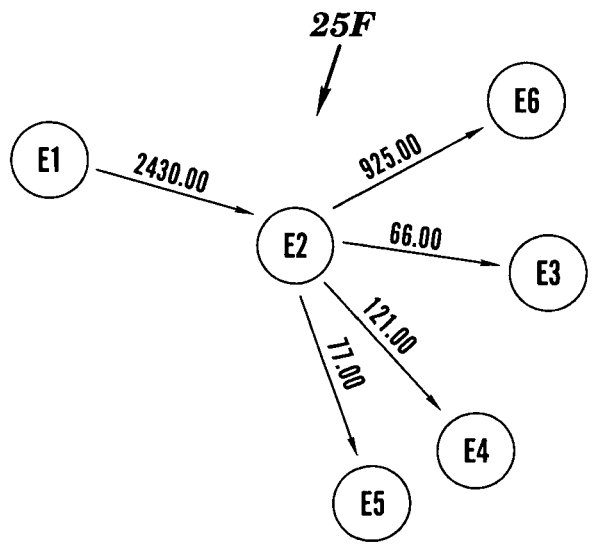

FIG. 11F depicts a directed graph 25F having focus node E2 and peripheral nodes E1, E3, E4, E5, and E6, and encompassing the time interval of June 1998.

Figure 11G:
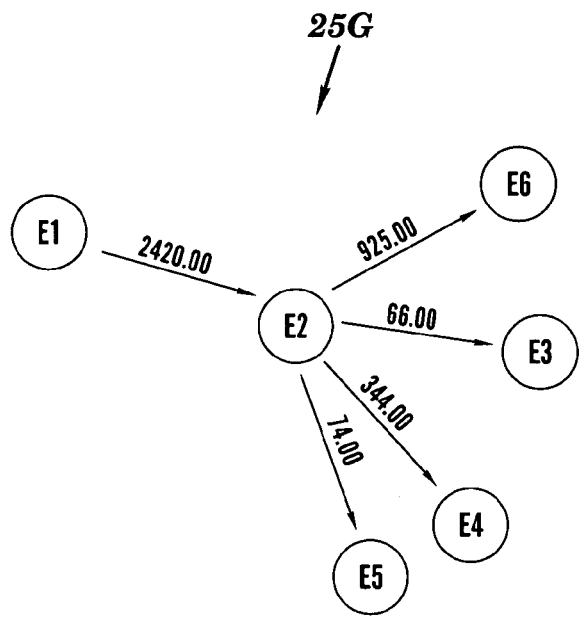

FIG. 11G depicts a directed graph 25G having focus node E2 and peripheral nodes E1, E3, E4, E5, and E6, and encompassing the time interval of July 1998.

Figure 11H:
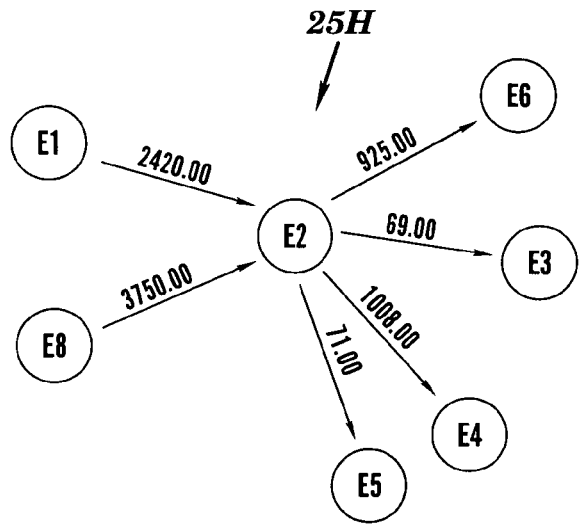

FIG. 11H depicts a directed graph 25H having focus node E2 and peripheral nodes E1, E3, E4, E5, E6, and E8, and encompassing the time interval of August 1998.

Figure 11I:
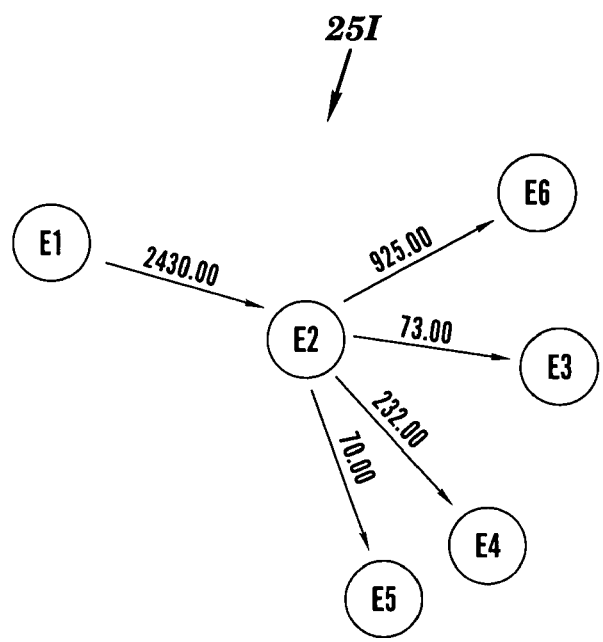

FIG. 11I depicts a directed graph 25I having focus node E2 and peripheral nodes E1, E3, E4, E5, and E6, and encompassing the time interval of September 1998.

Figure 11J:
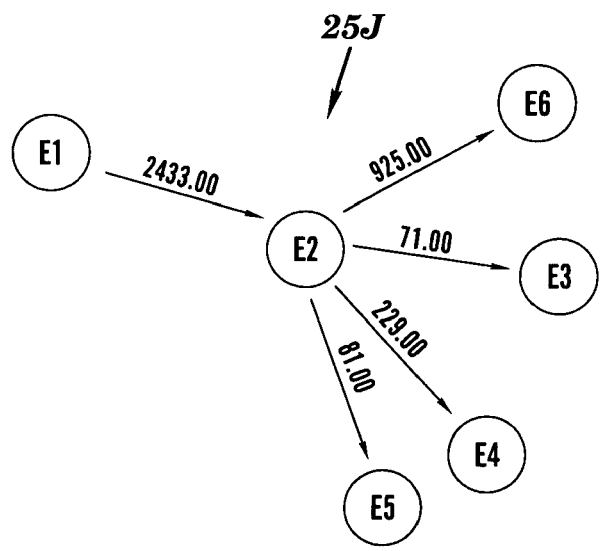

FIG. 11J depicts a directed graph 25J having focus node E2 and peripheral nodes E1, E3, E4, E5, and E6, and encompassing the time interval of October 1998.

Figure 11K:
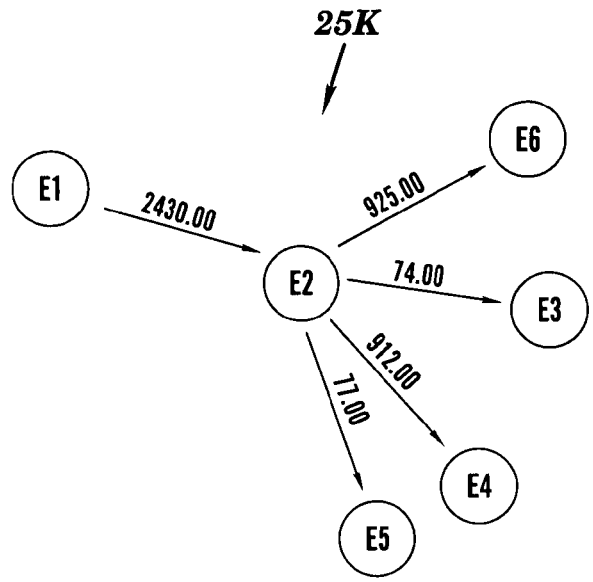

FIG. 11K depicts a directed graph 25K having focus node E2 and peripheral nodes E1, E3, E4, E5, and E6, and encompassing the time interval of November 1998.

Figure 11L:
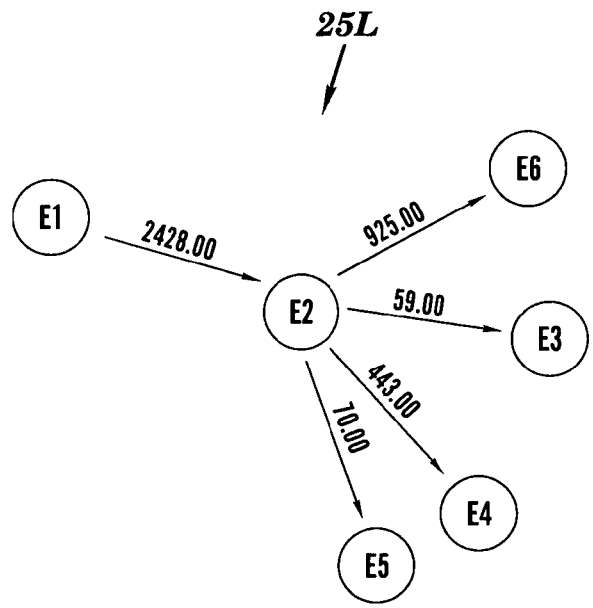

FIG. 11L depicts a directed graph 25L having focus node E2 and peripheral nodes E1, E3, E4, E5, and E6, and encompassing the time interval of December 1998.

It is noted that the peripheral entities are not the same peripheral entities in all 12 directed graphs.

The edges of each directed graph of FIG. 11 have a direction as indicated by the terminating arrow, and the numerical values shown at each edge is the weight of the edge. The weight associated with each edge represents the numerical sum ("SUM") of all transactions in the same direction between the focus entity E2 and the peripheral entity to which E2 is connected by the edge, for the time interval represented by the directed graph. In FIG. 11B, for example, the weight of 2430.00 on the edge between E1 and E2 is the sum of the transactions of 1210.00 of transaction number 9 occurring on Feb. 1, 1998, and 1220.00 of transaction number 12 occurring on Feb. 17, 1998 (see FIG. 10). The algorithm of calculating the weight as being equal to SUM is a special case of a more general algorithm in which the weight is a linear function of SUM. Alternatively, the weight could be a nonlinear function of SUM. As an example of such nonlinear functions, the weight could be proportional to SUM raised to a power P (i.e., $\{SUM\}^P$), wherein P>0 and P≠1. As another example, the weight could be proportional to exp(K*SUM), wherein K is a constant in the range of 0<K<1.

More generally, the weight of the edge could be deduced from the financial transactions in the same direction between E2 and the peripheral entity in the pertinent time period by an algorithm that does not involve SUM. For example, the weight could be equal to the root-mean-square of said financial transactions, in which case the weight of the edge between E1 and E2 in FIG. 1B would be replaced by 855.60 (i.e., $\{[1220-1825]^2+[2430-1825]^2\}^{1/2}$ since [1220+2430]/2=1825).

The weights of each directed graph of FIG. 11 could be represented by a matrix, as explained supra in conjunction with FIGS. 3, 4, and 6. Given the directed graphs of FIG. 11, the next step is to determine "out-of-norm" edges as determined by applying criteria, called "edge selection criteria". Any edge selection criteria could be used. The following first, second and third edge selection criteria are all applied during the comparison process of the present example to identify out-of-norm edges. Note that the transactions associated with the out-of-norm edges are called out-of-norm transactions.

The first edge selection criterion is that edges with weights that exceed the average of the weights of corresponding edges in the directed graphs by at least a pre-defined first percentage are out-of-norm-edges. Two edges of different directed graphs are corresponding edges if said two edges have the same focus entity and peripheral entity. The average is computed for those directed graphs which include the corresponding edges. The first pre-defined percentage is taken as 20% in application to the directed graphs of FIG. 11.

The second edge selection criterion is that corresponding edges with weights that vary from one directed graph to any other directed graph by at least a second pre-defined percentage are out-of-norm-edges. The second pre-defined percentage is taken as 30% in application to the directed graphs of FIG. 11.

The third edge selection criterion is that edges that do not appear in at least a third pre-defined percentage of directed graphs are out-of-norm-edges, wherein the third pre-defined percentage is greater than 50%. The third pre-defined percentage is taken as 80% in application to the directed graphs of FIG. 11.

By applying the first, second, and third criteria using the indicated numerical pre-defined percentages (i.e., 20%, 30%, and 80% for the first, second, and third pre-defined percentages), the out-of-norm edges and associated out-of-norm transactions for the directed graphs of FIG. 11 are as shown in Table 3.

TABLE 3

Out-of-Norm Edges For E2

| Out-of-Norm Edges or Transactions |
|---|
| E2, E8 |
| E2, E7 |
| E2, E4 |
| E2, E1 |
| E2, E9 |

Table 3 shows that the peripheral entities E1, E4, E7, E8, and E9 are peripheral entities participating in out-of-norm transactions with focus entity E2. Thus the entities E1, E4, E7, E8, and E9 are potential suspect entities. If none of E1, E4, E7, E8, and E9 can be validated as not being a suspect entity, then all of E1, E4, E7, E8, and E9 are suspect entities. However, one or more of E1, E4, E7, E8, and E9 may be eliminated from consideration of being suspect entities through use of validation criteria. For example, an identified set of validated entities may exist. As an example, entity E1 may have been validated from being E2's payroll account, entity E4 may have been validated from being E2's credit card account, and entity E9 may have been validated from being a government agency. Thus when E1, E4, and E9 are eliminated, the remaining potential suspect entities of E7 and E8 are consequently deemed to be suspect entities. The preceding process using E2 as the focus entity is denoted as a Level 1 process (or a process at a level depth of 1).

Next in a Level 2 process (or a process at a level depth of 2, or a process at a level of depth 2), entities E7 and E8 are each treated as a focus entity in the same manner that E2 was previously treated as a focus entity, with peripheral entities E10, E11, ..., E180 for financial transactions recorded in a database of a financial institution FI-2, wherein the financial institution FI-2 may be the same financial institution as the financial institution FI-1 or may be a different financial institution from the financial institution FI-1.

Note that financial transactions between E7 and E2, and between E8 and E2, are not considered, since the focus a Level M process does not consider the focus entities previously analyzed in Level 1, Level 2, ..., Level 1 processes for M=1, 2, ..., D, where D is a maximum level depth. In said Level 2 processes each using entities E7 and E8 as focus entities, the resulting out-of-norm edges or out-of-norm transactions relating to focus entities E7 and E8 as shown in Table 4.

TABLE 4

Out-of-Norm Edges For E7 and E8

| Out-of-Norm Edges or Transactions |
|---|
| E7, E15 |
| E7, E16 |
| E7, E23 |
| E7, E67 |
| E7, E43 |
| E7, E123 |
| E7, E142 |
| E7, E161 |
| E8, E32 |
| E8, E56 |
| E8, E67 |
| E8, E142 |
| E8, E161 |
| E8, E177 |

Table 4 shows that the peripheral entities E16, E23, E16, E67, E43, E123, E142, and E161 are potential suspect entities participating in out-of-norm transactions with focus entity E7, and the peripheral entities E56, E67, E142, E161, and E177 are potential suspect entities participating in out-of-norm transactions with focus entity E8. If a set of validating entities include E15 and E32 but do not include any other entity in Table 4, then Table 5 lists the resulting suspect entities of the Level and Level 2 processes.

TABLE 5

Suspect Entities For Level 1 and Level 2

Suspect Entities

E7
E8
E16
E23
E67
E43
E123
E142
E161
E56
E67
E142
E161
E177

Figure 12:
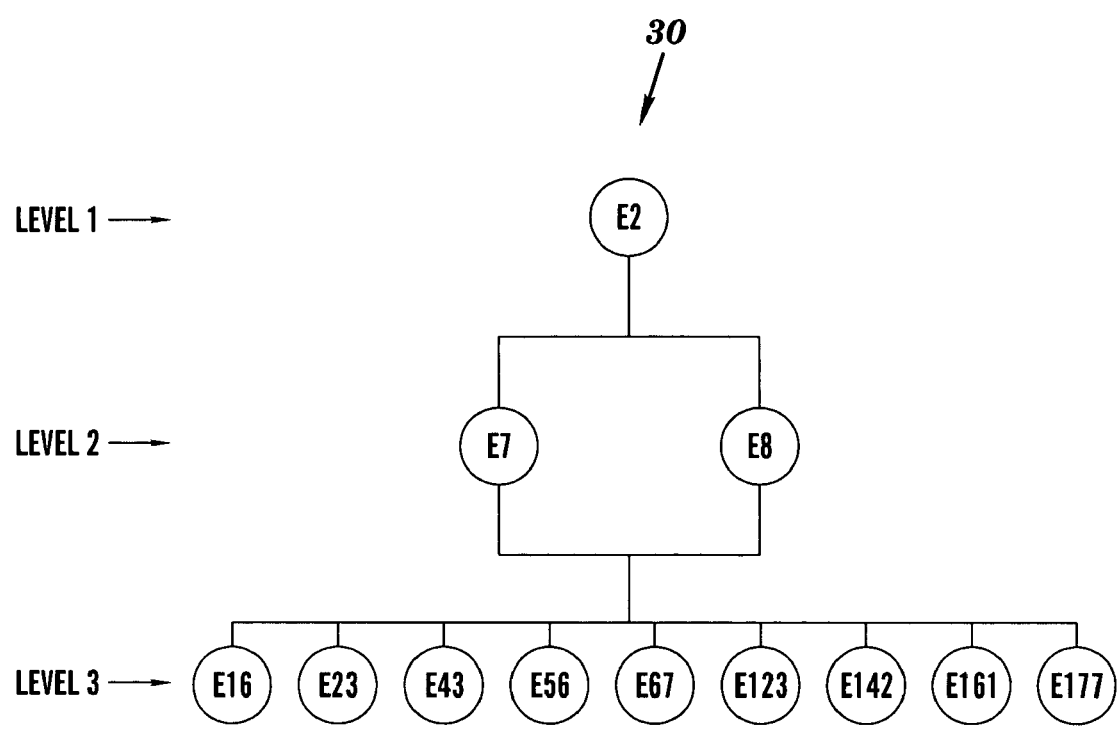
FIG. 12 depicts a tree structure showing the focus entities at different levels resulting from the analysis of the directed graphs of FIG. 11, in accordance with embodiments of the present invention.

In a similar manner, each of the suspect entities in Table 2 that were identified in the Level 2 processes (which excludes E7 and E8 since E7 and E8 were identified as suspect entities in the Level 1 process) become focus entities in Level 3 processes. FIG. 12 depicts a tree structure 30 showing the focus entities at Levels 1, 2, and 3 for this example, in accordance with embodiments of the present invention.

The method of the present invention may be performed to as many levels as desired. The total number of levels may be a pre-determined number (e.g., 1 level, 2 levels, more than 2 levels, etc.), or alternatively the number of levels may be dynamically determined as a function of the results derived from the processes performed. For example, the total number of levels may be dynamically determined by the number of levels required to identify a minimum number of suspect entities. In a given application, for example, 2 levels may be required to generate at least 10 suspect entities, but 4 levels may be required to generate at least 250 suspect entities.

Note that the terms "Level 2", "a level depth of 2", or a "level of depth 2" are equivalent.

FIGS. 13-16 are illustrative reports which may be generated from the results of the analysis of the directed graphs of FIG. 11, in accordance with embodiments of the present invention. These reports depict the suspect entities determined at each level of depth. FIG. 13 depicts Sample Report 1 which includes transaction details between focus entity E2 and each of peripheral entities E7 and E8, wherein said peripheral entities were determined to be suspect entities in the Level 1 process having E2 as the focus entity. FIG. 14 depicts Sample Report 2 which includes transaction details between focus entity E7 and each of peripheral entities E23, E16, E67, E43, E123, E142, and E161, wherein said peripheral entities were determined to be suspect entities in the Level 2 process having E7 as the focus entity. FIG. 15 depicts Sample Report 3 which includes transaction details between focus entity E8 and each of peripheral entities E56, E67, E142, E43, E161, and E177, wherein said peripheral entities were determined to be suspect entities in the Level 2 process having E8 as the focus entity. FIG. 16 depicts Sample Report 4 which includes a list of Level 2 suspect entities associated with each Level 2 focus entity (i.e., E7 and E8).

While the preceding discussion was developed in consideration of one initial focus entity, namely E2, this example has two such initial focus entities: E2 and E8. Thus, the procedure described supra for initial focus entity E2 is to be repeated for initial focus entity E8. Generally, there is a set of any number of such initial focus entities, and the procedure described supra for initial focus entity E2 is to be performed for each initial focus entity in the set of initial focus entities.

Figure 17:
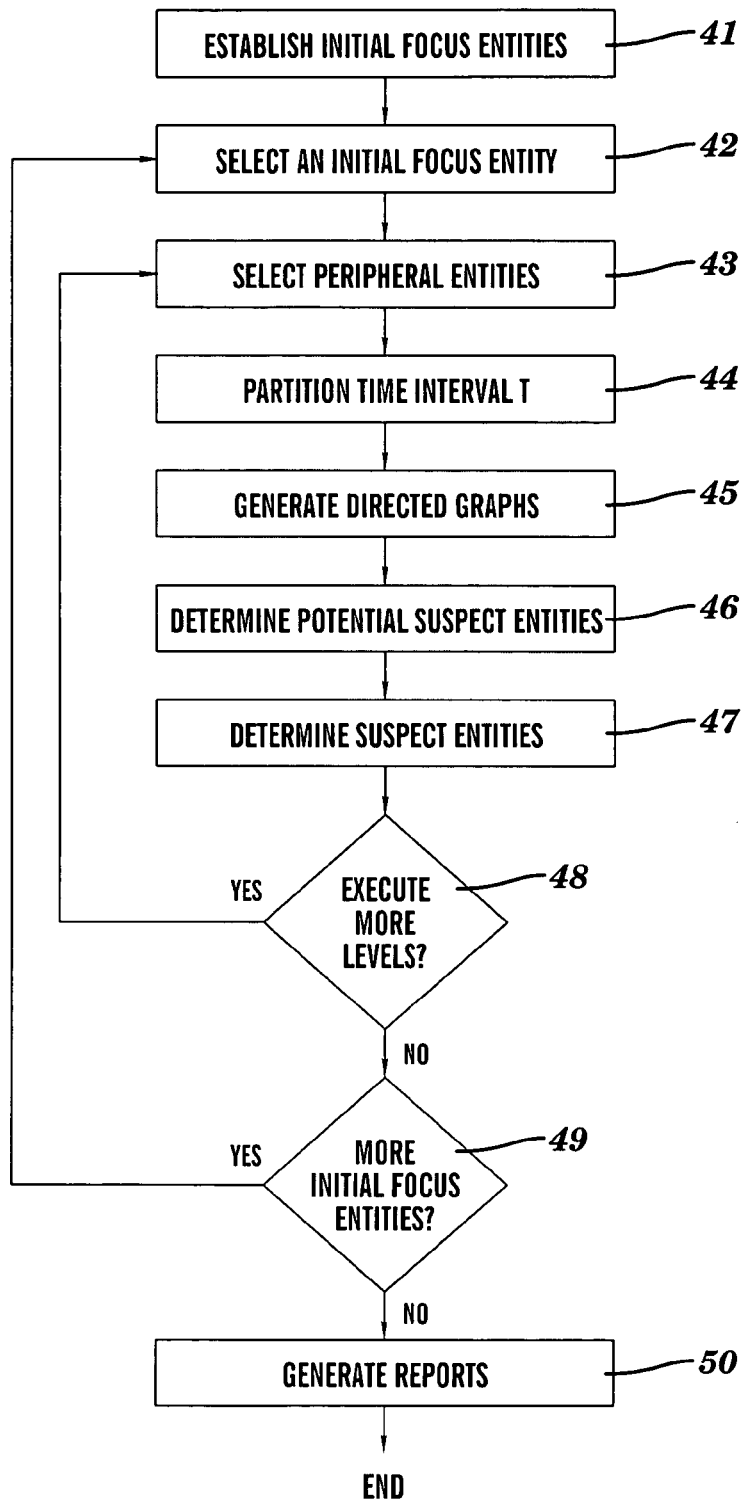
FIG. 17 is a flow chart that depicts a method for determining suspect entities in financial transactions, in accordance with embodiments of the present invention.

FIG. 17 is a flow chart that depicts a method for determining suspect entities in financial transactions, in accordance with embodiments of the present invention. The method assumes access to a database of financial transactions, such as the database of the financial institution FI-1 of the example described supra. The database includes financial transactions within a period of time T, such as a period T of one year of the example described supra. The flow chart of FIG. 17 includes steps 41-50.

Step 41 determines an set of initial focus entities, such as the set of E2 and E8 of the example described supra.

Step 42 selects one focus entity from the set of focus entities determined in step 41, such as E2 of the example described supra.

Step 43 determines a set of peripheral entities (e.g., a plurality of peripheral entities) in conjunction with the focus entity selected in step 42, such as the peripheral entities E1, E3, E4, E5, E6, E7, E8, and E9 in conjunction with the focus entity E2 in the Level 1 process of the example described supra.

Step 44 partitions the period of time T into a plurality of time intervals, such as the monthly time intervals of the example described supra.

Step 45 generates a weighted unifocused directed graph for each time interval resulting from step 44, such as the weighted unifocused directed graphs depicted in FIG. 11 of the example described supra. Note that each directed graph consists of a focus node, a plurality of peripheral nodes, and edges between the focus node and the peripheral nodes. Each peripheral node represents a peripheral entity having at least one or more directed financial transactions with the focus entity within the time interval represented by the directed graph. Each edge has a weight, wherein the weight may be a function of the sum of the directed financial transactions between the focus node and the peripheral nodes within the time interval, as described supra. Alternatively, the weight be not be a function of the sum of the directed financial transactions between the focus node and the peripheral nodes, as described supra.

Step 46 determines a set of potential suspect entities from analysis of the directed graphs generated in step 45, as in the example described supra in which entities E1, E4, E7, E8, and E9 were determined to be potential suspect entities, based on applying edge selection criteria to the directed graphs of FIG. 11.

Step 47 determines suspect entities from the set of potential suspect entities determined in step 47, such as the suspect entities E7 and E8 after application of validation criteria to eliminate E1, E4, and E9 from the set of set of potential suspect entities of the example described supra. However, some embodiments of the present invention do not utilize such validation criteria.

Noting that steps 43-47 were described supra for a Level M calculation (e.g., M=1 as previously described for steps 43-47), step 48 determines whether one or more Levels remain to be executed (i.e., whether Level M+1 should be executed). As discussed supra, the total number of levels may be predetermined or dynamically determined. For the example, as described supra, Level 2 calculations are performed with steps 43-47 following the Level 1 calculation, wherein each of suspect entities E7 and E8 resulting from the Level 1 calculation each become a focus entity for the Level 2 calculations. When step 48 determines that no more Levels remain to be executed, then step 49 is next executed.

Step 49 determines whether any more initial focus entities remain to be processed, wherein the set of initial focus entities were established in step 41. If step 49 determines that one or more focus entities remain to be processed, then a new initial focus entity is selected in step 42 and new suspect entities are determined by steps 43-48. For the example described supra, after the initial focus entity E2 is processed, the remaining initial focus entity E8 is processed by re-execution of steps 43-48 with E8 being the focus entity. When step 49 determines that no more initial focus entities remain to be processed, then step 50 is next executed.

Step 50 generates reports which include the results of the analysis performed in steps 41-49, such as the reports depicted in FIGS. 13-16 and described supra. Although FIG. 17 indicates generation of said reports after step 49, each report may be generated at any time in which the all data appearing in the report has been determined. For example, Sample Report 1 of FIG. 13 may be generated between steps 47 and 48, since the suspect entities E7 and E8 are determined in step 47.

Figure 18:
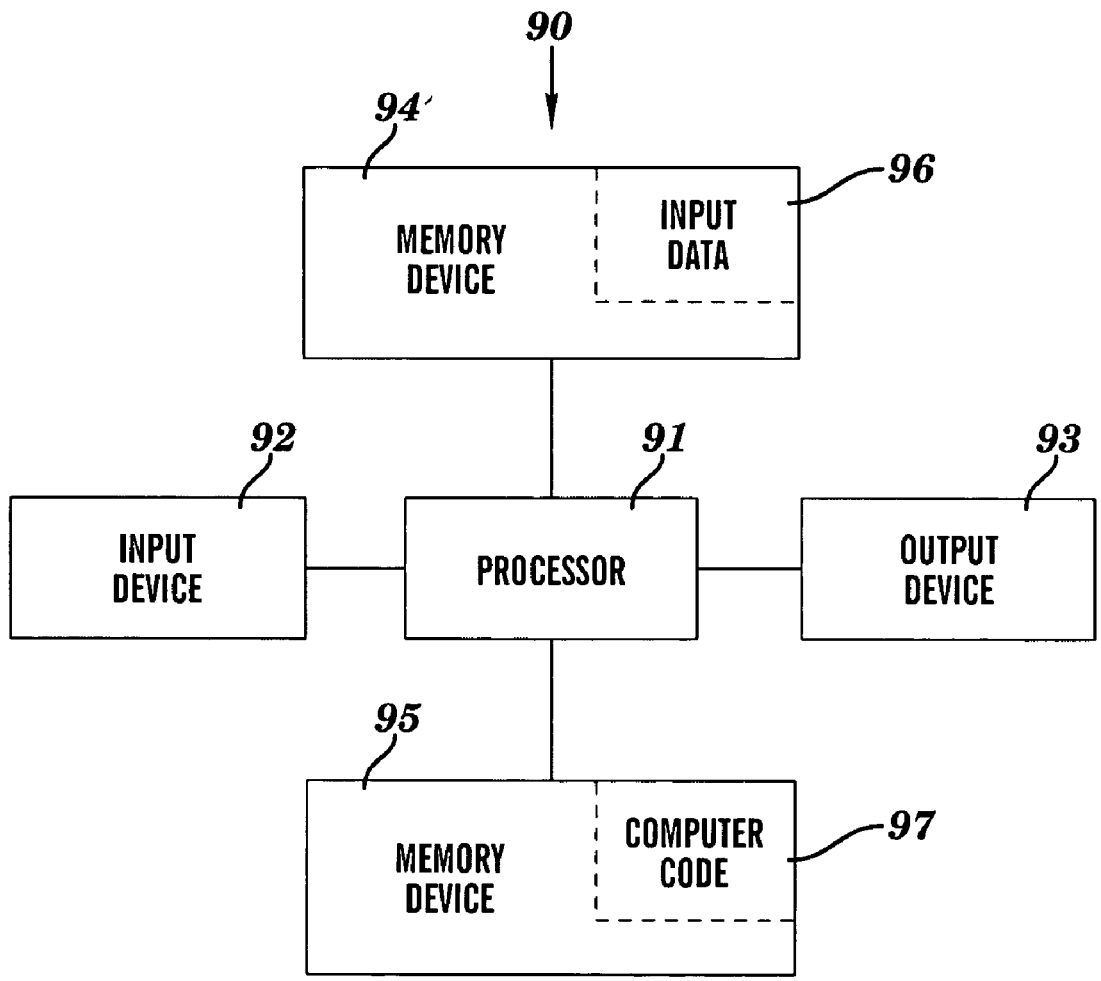
FIG. 18 illustrates a computer system used for determining suspect entities in financial transactions, in accordance with embodiments of the present invention.

FIG. 18 illustrates a computer system 90 used for determining suspect entities in financial transactions, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for determining suspect entities in financial transactions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 18) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 18 shows the computer system 90 as a particular configuration of hardware and software, any configuration of hardware and software, as would be known to a person of ordinary skill in the art, may be utilized for the purposes stated supra in conjunction with the particular computer system 90 of FIG. 18. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for determining suspect entities engaged in financial transactions, said method comprising the steps of:
   a) selecting a focus entity F and a plurality of peripheral entities, each peripheral entity having one or more financial transaction with F within a period of time T;
   b) partitioning the period of time T into a plurality of time intervals;
   c) generating, by a processor of a computer system, a unifocused directed graph for each time interval of the plurality of time intervals, each directed graph consisting of a focus node, a plurality of peripheral nodes, and edges between the focus node and the peripheral nodes, the focus node representing F, each peripheral node representing a peripheral entity having at least one directed financial transaction of said one or more directed financial transactions with F within the time interval, each edge having a weight, said weight being a function of the at least one directed financial transaction between F and the peripheral node within the time interval;
   d) determining, from the directed graphs or from a representation of the directed graphs, whether any of said edges are out-of-norm edges, said determining including applying edge-selection criteria to the weights associated with the edges of the directed graphs;
   e) if any of said edges are so determined to be out-of-norm edges then identifying at least one potential suspect entity from the out-of-norm edges, followed by deriving at least one suspect entity from the at least one potential suspect entity; and
   after performing step e) at level 1: performing steps b), c), d), and e) to level L for each suspect entity determined in step e) at levels 1, 2, . . . L−1, wherein F represents said each suspect entity for which steps b), c), d), and e) are performed, and wherein L is at least 2.

2. The method of claim 1, said method further comprising prior to performing step a): identifying the one or more directed financial transactions which are recorded in, or managed by, a database of a financial institution.

3. The method of claim 1, wherein the partitioning in step b) includes taking into account the distribution over time within the period of time T of the one or more directed financial transactions.

4. The method of claim 1, wherein the partitioning in step b) does not include taking into account the distribution over time within the period of time T of the one or more directed financial transactions.

5. The method of claim 1, wherein the time intervals of the plurality of time intervals resulting from step b) are constant time intervals.

6. The method of claim 1, wherein the time intervals of the plurality of time intervals resulting from step b) are variable time intervals.

7. The method of claim 1, wherein the function in step c) is proportional to the sum of the directed financial transactions between F and the peripheral node within the time interval.

8. The method of claim 7, wherein the function in step c) is a linear function of said sum.

9. The method of claim 7, wherein the function in step c) is a nonlinear function of said sum.

10. The method of claim 1, wherein the determining in step d) is from the representation of the directed graphs, and wherein said representation is a matrix representation of the directed graphs.

11. The method of claim 1, wherein said determining at least one suspect entity in step e) includes determining whether the at least one potential suspect entity includes at least one valid entity, and if it is so determined that the at least one potential suspect entity includes the at least one valid entity then the at least one suspect entity consists of the at least one potential suspect entity exclusive of the at least one valid entity.

12. The method of claim 1, wherein L exceeds 2.

13. A computer system comprising:
 a processor; and
  a computer readable storage medium, said processor configured to execute computer readable program code, said computer readable program code stored on the computer readable storage medium, said computer readable program code comprising an algorithm for determining suspect entities engaged in financial transactions, said algorithm configured to execute the steps of:
   a) selecting a focus entity F and a plurality of peripheral entities, each peripheral entity having one or more financial transaction with F within a period of time T;
   b) partitioning the period of time T into a plurality of time intervals;
   c) generating a unifocused directed graph for each time interval of the plurality of time intervals, each directed graph consisting of a focus node, a plurality of peripheral nodes, and edges between the focus node and the peripheral nodes, the focus node representing F, each peripheral node representing a peripheral entity having at least one directed financial transaction of said one or more directed financial transactions with F within the time interval, each edge having a weight, said weight being a function of the at least one directed financial transaction between F and the peripheral node within the time interval;
   d) determining, from the directed graphs or from a representation of the directed graphs, whether any of said edges are out-of-norm edges, said determining including applying edge-selection criteria to the weights associated with the edges of the directed graphs;
   e) if any of said edges are so determined to be out-of-norm edges then identifying at least one potential suspect entity from the out-of-norm edges, followed by deriving at least one suspect entity from the at least one potential suspect entity; and
  wherein said algorithm is further configured to execute after step e) at level 1: executing steps b), c), d), and e) to level L for each suspect entity determined in step e) at levels 1, 2, ... L−1, wherein F represents said each suspect entity for which steps b), c), d), and e) are performed, and wherein L is at least 2.

14. The computer system of claim 13, said algorithm further configured to execute prior to step a) the step of: identifying the one or more directed financial transactions which are recorded in, or managed by, a database of a financial institution.

15. The computer system of claim 13, wherein the partitioning in step b) includes taking into account the distribution over time within the period of time T of the one or more directed financial transactions.

16. The computer system of claim 13, wherein the partitioning in step b) does not include taking into account the distribution over time within the period of time T of the one or more directed financial transactions.

17. The computer system of claim 13, wherein the time intervals of the plurality of time intervals resulting from step b) are constant time intervals.

18. The computer system of claim 13, wherein the time intervals of the plurality of time intervals resulting from step b) are variable time intervals.

19. The computer system of claim 13, wherein the function in step c) is proportional to the sum of the directed financial transactions between F and the peripheral node within the time interval.

20. The computer system of claim 19, wherein the function in step c) is a linear function of said sum.

21. The computer system of claim 19, wherein the function in step c) is a nonlinear function of said sum.

22. The computer system of claim 13, wherein the determining in step d) is from the representation of the directed graphs, and wherein said representation is a matrix representation of the directed graphs.

23. The computer system of claim 13, wherein said determining at least one suspect entity in step e) includes determining whether the at least one potential suspect entity includes at least one valid entity, and if it is so determined that the at least one potential suspect entity includes the at least one valid entity then the at least one suspect entity consists of the at least one potential suspect entity exclusive of the at least one valid entity.

24. The computer system of claim 13, wherein L exceeds 2.

25. A computer program product, comprising a computer usable medium having a computer readable program code embodied therein, said computer readable program code comprising an algorithm for determining suspect entities engaged in financial transactions, said algorithm configured to execute the steps of:
 a) selecting a focus entity F and a plurality of peripheral entities, each peripheral entity having one or more financial transaction with F within a period of time T;
 b) partitioning the period of time T into a plurality of time intervals;
 c) generating a unifocused directed graph for each time interval of the plurality of time intervals, each directed graph consisting of a focus node, a plurality of peripheral nodes, and edges between the focus node and the peripheral nodes, the focus node representing F, each peripheral node representing a peripheral entity having at least one directed financial transaction of said one or more directed financial transactions with F within the time interval, each edge having a weight, said weight being a function of the at least one directed financial transaction between F and the peripheral node within the time interval;
 d) determining, from the directed graphs or from a representation of the directed graphs, whether any of said edges are out-of-norm edges, said determining including applying edge-selection criteria to the weights associated with the edges of the directed graphs;
 e) if any of said edges are so determined to be out-of-norm edges then identifying at least one potential suspect entity from the out-of-noun edges, followed by deriving at least one suspect entity from the at least one potential suspect entity; and wherein said algorithm is further configured to execute after step e) at level 1: executing steps b), c), d), and e) to level L for each suspect entity determined in step e) at levels 1, 2, . . . L−1, wherein F represents said each suspect entity for which steps b), c), d), and e) are performed, and wherein L is at least 2.

26. The computer program product of claim 25, said algorithm further configured to execute prior to step a) the step of: identifying the one or more directed financial transactions which are recorded in, or managed by, a database of a financial institution.

27. The computer program product of claim 25, wherein the partitioning in step b) includes taking into account the distribution over time within the period of time T of the one or more directed financial transactions.

28. The computer program product of claim 25, wherein the partitioning in step b) does not include taking into account the distribution over time within the period of time T of the one or more directed financial transactions.

29. The computer program product of claim 25, wherein the time intervals of the plurality of time intervals resulting from step b) are constant time intervals.

30. The computer program product of claim 25, wherein the time intervals of the plurality of time intervals resulting from step b) are variable time intervals.

31. The computer program product of claim 25, wherein the function in step c) is proportional to the sum of the directed financial transactions between F and the peripheral node within the time interval.

32. The computer program product of claim 31, wherein the function in step c) is a linear function of said sum.

33. The computer program product of claim 31, wherein the function in step c) is a nonlinear function of said sum.

34. The computer program product of claim 25, wherein the determining in step d) is from the representation of the directed graphs, and wherein said representation is a matrix representation of the directed graphs.

35. The computer program product of claim 25, wherein said determining at least one suspect entity in step e) includes determining whether the at least one potential suspect entity includes at least one valid entity, and if it is so determined that the at least one potential suspect entity includes the at least one valid entity then the at least one suspect entity consists of the at least one potential suspect entity exclusive of the at least one valid entity.

36. The computer program product of claim 25, wherein L exceeds 2.

37. The method of claim 1, wherein for each unifocused directed graph, each peripheral node is directly connected to the focus node by a different edge of said edges and no two peripheral nodes have a connecting edge therebetween.

38. The computer system of claim 13, wherein for each unifocused directed graph, each peripheral node is directly connected to the focus node by a different edge of said edges and no two peripheral nodes have a connecting edge therebetween.

39. The computer program product of claim 25, wherein for each unifocused directed graph, each peripheral node is directly connected to the focus node by a different edge of said edges and no two peripheral nodes have a connecting edge therebetween.

* * * * *